March 13, 1962  R. F. CHAPMAN  3,025,473
AUTOMATIC GAIN CONTROL SYSTEM
Filed May 13, 1959  2 Sheets-Sheet 1
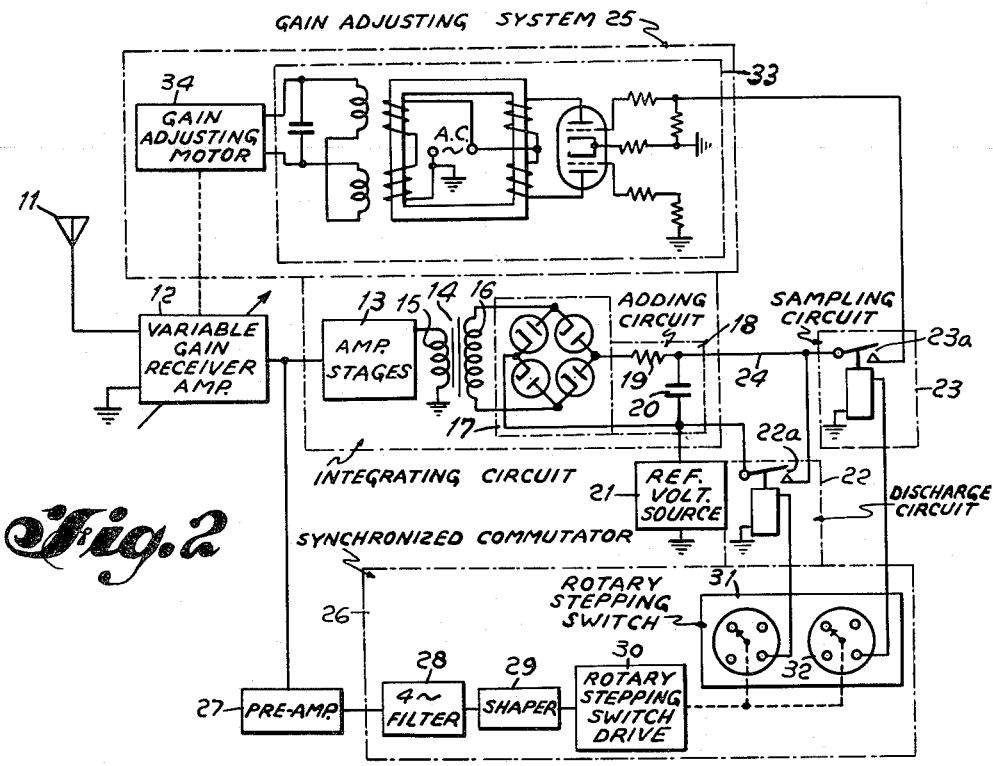
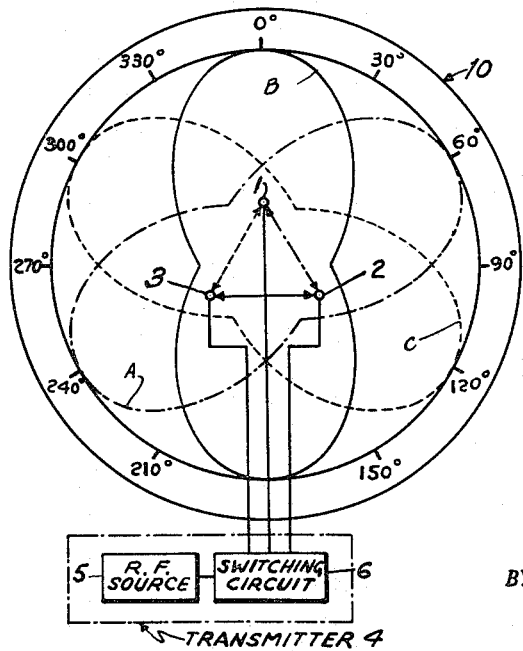
INVENTOR.
RICHARD F. CHAPMAN
BY
ATTORNEY

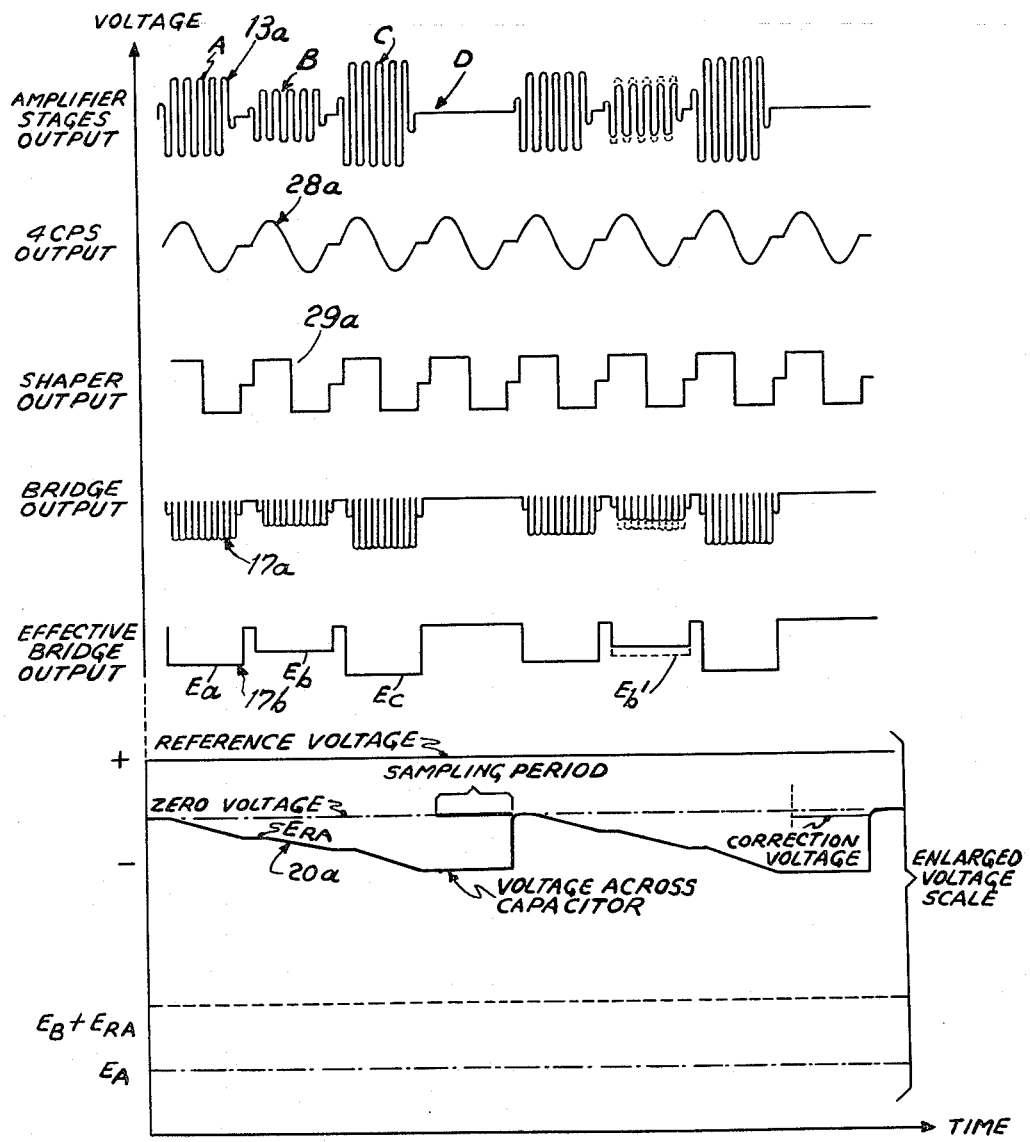

United States Patent Office 3,025,473
Patented Mar. 13, 1962

3,025,473
AUTOMATIC GAIN CONTROL SYSTEM
Richard F. Chapman, Nutley, N.J., assignor to International Telephone and Telegraph Corporation, Nutley, N.J., a corporation of Maryland
Filed May 13, 1959, Ser. No. 812,957
9 Claims. (Cl. 330—136)

This invention relates to improvements in automatic gain control circuits and more particularly, although not necessarily exclusively, to improvements in automatic gain control circuits for use in pulse signal reception.

More particularly, this invention relates to an improved automatic gain control in a system in which the sum of the individual amplitudes of the transmitted pulses in a signal group is equal to a constant value although the individual amplitudes of the corresponding pulses of successive groups may vary.

One such type of system is known as "Navaglobe." In the publication, "Electric Communication," vol. 31, No. 3, dated September 1954, and published by International Telephone & Telegraph Corporation, there is a complete disclosure of the Navaglobe operation. In this system, the Navaglobe radio range beacon system provides a radio beacon consisting essentially of three transmitting antennae arranged in an equilateral triangle with means provided to successively energize the antennae in pairs so that different distributions of the energy are produced in different directions about the beacon. The result is the radiation of radio frequency energy for each antennae pair in directional patterns resembling a figure-of-eight; each pattern being shifted 120° in orientation from the adjacent pattern. Consequently, at any direction from the transmitter, a cyclic succession of three bearing information signals can be received at a receiver station with the relative amplitudes of these signals depending on the bearing angle of the receiving station in respect to the transmitting station. However, the summation of the relative amplitudes of these signals is a constant value and independent of the bearing angle. Furthermore, at the beginning of each cycle of antenna pair energization, a synchronizing signal is provided so that receiving means in an aircraft or other vehicle may synchronize the signals from the antenna pairs to establish its bearing relative to the beacon. One such beacon and receiver arrangement is shown in U.S. Patent No. 2,541,040, issued February 13, 1951, to R. I. Colin. As shown in the Colin patent and also as originally employed in the Navaglobe system, a characteristic Navaglobe synchronizing signal consisting of a radiated pulse or group of pulses is radiated omnidirectionally at one cycle per second and serves to mark the start of the cycle of the three directional signals from the three pairs of antennae. However, this use of a synchronizing signal has been modified to eliminate the synchronizing pulses and a silent interval is employed to mark the end of each cycle. Thus, the radiated signals from the pairs of antennae are received at a craft or vehicle and the silent intervals serve as synchronizing signals to synchronize a distributor control so that the successively received signals from the pairs of antennae may be utilized to indicate the craft's bearing relative to the beacon.

At the Navaglobe receiver, if the bearing information signals received are of great amplitude because, for instance, of the proximity of the receiver station to the transmitter station, the inherent time constant of the system is disturbed since a resultant error signal is consequently large. It follows that if information bearing signals are characterized by small amplitudes, for instance, for lack of said proximity this condition also disturbs the inherent time constant of the system. It becomes clear that an automatic gain control system is a necessary part of such a receiver in order to effect a proper time constant for the system utility. In a U.S. patent application of M. Rogoff, Serial No. 627,156, filed December 10, 1956, entitled "Radio Navigational Aid Receiver" and assigned to the same assignee as this application, an improvement of the automatic gain control system of the Navaglobe receiver has been disclosed in which the signal triads were used to drive a drag cup motor. The rate of rotation was then compared to a reference generator driven by the distributor motor. The difference in the rates of the two rotations was then used to supply correction data to a servo-mechanical loop which in turn drives a movable arm which adjusts the gain of the receiver. While the automatic gain control loop disclosed in the aforementioned application, U.S. Serial No. 627,156, operates well and has been used to a great extent, it is apparent that a less complex and inexpensive system is desirous.

It is, therefore, an object of this invention to provide a simple and improved automatic gain control for a receiver adapted to receive signals in pulse groups.

A further object is to provide an electrical reference voltage source which cooperates with the applied voltages to apply the correction data to the automatic gain control system, if such correction is required.

Another object is to reduce the number of moving parts and other components heretofore required in such an automatic gain control system.

This invention accordingly features the comparison of the voltage appearing at the output of an integrating circuit, to which is applied the signals detected by the receiver, with an adjustable reference voltage. If any error voltage is present when the comparison is made, it is applied to the gain adjusting system of the receiver.

While the invention will be described in connection with a Navaglobe system it will be understood that it is capable of use with any other pulse signaling system wherein, the summation of the amplitudes of the pulses in a group of a set of groups is to be maintained substantially constant for each group of the set.

The above-mentioned and other features and objects of this invention will become more apparent by reference to the following description taken in conjunction with the accompanying drawings in which:

FIG. 1 illustrates the general arrangement of a Navaglobe radar beacon together with a field pattern distribution which may be expected from one form of Navaglobe system;

FIG. 2 is a schematic diagram in block form of one embodiment of a receiver incorporating the improved AGC system of this invention;

FIG. 3 is a graphic representation of waveforms helpful in explaining the operation of the automatic gain control system of this invention. The waveforms are ideally represented to facilitate their illustration and understanding of the invention. The lower portion of the vertical axis is drawn at a relatively larger scale than the upper portion and is so delineated.

Referring to FIG. 1, there are represented typical field patterns which may be produced by antennae 1, 2 and 3. The transmitter 4 is shown to comprise a radio frequency transmitting source 5 and switching circuit 6. Switching circuit 6 is coupled to antennae 1, 2 and 3 so as to energize the antennae cyclically in four steps. Antenna pairs 1, 2; 2, 3; and 3, 1 are each successively energized by switching circuit 6 for periods represented by pulses A, B, C. When antennae 1 and 2 are energized, preferably cophasally, the radiation pattern shown in dot-dash lines at A will be produced. Successively thereafter, antennae 2, 3 will be energized producing pattern B and antennae 3, 1 producing pattern C. Thus, it will be seen as indicated by the scale 10 that a difference in amplitude ratio of energies from patterns A, B and C will be produced about the beacon. It will be seen that only 180° ambiguity exists. This ambiguity can be resolved readily by ascertaining the geographical position of the craft or may be resolved by direction finding on two or more beacons or other radiation points to locate generally the position of the craft. In the last step, none of the antennae are energized for the last quarter of the cycle, effectively producing a gap or interval which may be considered as a synchronizing signal. However, if it is desirous to transmit an energized synchronizing signal, the present application would still be operative as explained hereinafter.

Referring to FIG. 2, receiving antenna 11 is coupled to variable gain receiver amplifier circuit 12 which may be a conventional superheterodyne receiver type without the detector circuits. Receiver amplifier circuit 12 is coupled to an integrating circuit comprising successive amplifier stages 13 followed by transformer 14 for further amplification. The primary winding 15 of transformer 14 is coupled to the final amplifier stage of circuit 13 and is properly grounded. The secondary winding 16 is coupled to the input of full wave rectifier bridge circuit 17 and is disassociated from ground. The output of bridge circuit 17 is shunted by adding circuit 18 comprising resistor 19 and capacitor 20 connected in series. The time constant of adding circuit 18 is much longer than the period of any one of the signal pulses. A variable reference voltage source 21 is also connected to the capacitor 20. Shunted across the output of capacitor 20 is discharge circuit 22, which consists of a switch operated relay 22a. Discharge circuit 22 is normally open and closed momentarily at the end of the sampling interval. Coupled across the combined output of capacitor 20 and reference voltage source 21 is sampling circuit 23 which includes relay operated switch 23a which is normally open and effectively leaves conductor 24 open circuited. Sampling circuit 23 closes at the commencement of the sampling interval thereby closing line 24 and allows a correction voltage, if present, to be applied to the gain adjusting system 25 which in turn adjusts the gain of the variable gain receiver amplifier circuit 12. At the end of the sampling interval, sampling circuit 23 again open circuits conductor 24.

In order to synchronize properly, the sampling and discharge cycles, a synchronized commutator 26 similar to the one disclosed in a U.S. Patent application of P. R. Adams et al., Serial No. 759,513, filed September 8, 1958, now Patent No. 2,938,204, entitled "Aerial Navigation Indicator" may be utilized. However, for the sake of simplicity in the embodiment shown in the present application, the detailed features of the synchronized commutator as it pertains to the automatic bearing angle indicator means of the Navaglobe receiver is omitted. The input of preamplifier 27 is connected to receiver amplifier circuit 12 and its output is fed to synchronized commutator device 26. Synchronized commutator 26 includes a four-cycle high Q filter amplifier 28 responsive to the rectified output of preamplifier 27. The purpose of filter 28 is to detect the four-cycle signal component of the transmitted energy from the beacon and produce a four-cycle sinewave such as shown at 28a in FIG. 3. This four-cycle sinewave is then fed to shaper 29 which shapes it into a positive swinging square wave 29a for energizing a rotary stepping switch drive 30. Switch drive 30 drives two sets of rotary switches 31 and 32. For the synchronization of the gain control system, switches 31 and 32 are utilized. The first three terminals of switches 31 and 32 which are shown open circuited may be used in other circuits not shown here. The fourth terminals of switches 31 and 32 are respectively coupled to discharge circuit 22 and sampling circuit 23 which as explained previously may be the windings of relays that when energized close normally open discharge circuit 22 and sampling circuit 23.

The gain adjusting system 25 may be of any type that is responsive to a correction voltage. One such system, comprises a balanced magnetic amplifier circuit 33 and gain adjusting motor 34 connected to the variable gain receiver amplifier 12 as shown in FIG. 2.

Referring to FIGS. 2 and 3 and specifically referring to its application in Navaglobe receivers, the circuit operates as follows:

The Navaglobe triads A, B and C are received by antenna 11 and beat down to a suitable IF frequency in receiver amplifier circuit 12. At the present time, this IF frequency is in the neighborhood of 1500 c.p.s. During the periods of the reception of A, B and C signal triads, discharge circuit 22 and line 24 via sampling circuit 23 are open circuited. These IF signals are further amplified by means of successive amplifier stages 13 and appear at the input of transformer 14 as the instantaneous waveform 13a illustrated in FIG. 3. After a 180° phase inversion encountered by passage through the transformer, the IF signal triads A, B and C are coupled to full wave rectifier bridge circuit 17 and appear at the output as shown in the illustration 17a. This latter waveform is also illustrated in its effective waveform 17b, which is essentially the envelope of the IF rectified signal instantaneous waveform 17a. At the commencement at the A interval pulse the bridge output will appear entirely across the resistor 19. As the capacitor 20 begins to charge an output waveform 20a as illustrated in FIG. 3 will appear across it. Since the time constant of adding circuit 18 is much longer than either the period or the width of any of the pulses received, the voltage across capacitor 20 will appear as a linear function, and if the A interval pulse was allowed to be applied continuously, the capacitor voltage output waveform would become asymptotic to the reference line $E_A$ which represents the effective value of the A signal. At the end of the application of pulse A, there will be a discharge path presented across adding circuit 18 comprising the high inverse resistance of bridge circuit 17, but the discharge will be negligible because this high inverse resistance further increases the time constant of adding circuit 18. Furthermore, the pulse width of any of the signals is substantially equal to the width of its period, or stated in another way, the interval between pulses is very much smaller than the width of the pulses and therefore the discharge time represents only a small fraction of the period of one pulse and an even smaller fraction of the discharge time constant. For a practical matter then, during the period of discharge the voltage waveform across capacitor 20 appears as a horizontal line. When the signal pulse B appears, capacitor 20 again begins to charge, as shown in FIG. 3, and if it were allowed to continue to charge the waveform across capacitor 20 would become asymptotic to the reference line $E_B + E_{RA}$ which are respectively the effective values of the B interval pulse and effective value of the residual voltage appearing on capacitor 20 at the end of the A signal period. At the end of the B signal pulse width, the capacitor again begins to discharge in a similar manner described in the operation of the A signal pulse. In a like manner, the operation is again repeated on application of the C signal pulse, so that the voltage across the capacitor forms a descending step function, as illustrated 20a. At the commencement of the D interval or synchronizing signal of the Navaglobe system, the sampling circuit closes line 24 which applies the correction voltage comprising the combined output of the reference voltage of circuit 21 and the voltage appearing on capacitor 20 to the AGC system 25.

Under normal operating conditions and because of the nature of the transmitted Navaglobe signals, the sum of the amplitudes of the pulses in a pulse group is equal to the sum in any other pulse group regardless of the receiver's orientation with the beacon. The individual amplitudes of the pulses in a given group are dependent on the orientation of the receiver with the Navaglobe beacon but are so interrelated that they complement each other to give this proper addition. Therefore, capacitor 20 will always charge to the same value during each group and regardless of the receiver's orientation if the pulse amplitudes do not distort with respect to one another. Reference voltage source 21 is adjusted to be of equal magnitude but of opposite polarity to this summation voltage so that if the applied signals have complemented each other properly during the transmission of the group, then no correction voltage will appear to the AGC system during the sampling time. However, if the signals do not properly complement each other in a group, as for example, as shown in $E_b'$, which represents a distortion of the B pulse amplitude, then a correction voltage will be applied to the AGC system to compensate for this error as illustrated. At the end of the sampling period which corresponds to interval D, discharge circuit 22 effectively shorts out capacitor 20 causing it to discharge. At the same time, sampling circuit 23 effectively open circuits line 24 so that at the end of the D interval the cycle is ready to repeat itself once more.

Referring again to FIG. 2, the intermediate frequency output from receiver 11 comprising a 1500 c.p.s. voltage modulated by the characteristic Navaglobe keying cycle is directed into two channels. The first output is directed to adding circuit 18 via amplifier stages 13, transformer 14 and rectifier circuit 17 as explained previously, and the second passes through high Q four-cycle filter amplifier 28 via preamplifier 27. The high Q of filter 28 enables the silent interval to "coast through" so that the output of the filter is essentially a four-cycle per second sinewave 28a, FIG. 3. This output is then applied to shaping circuit 29 which has its operating point so selected that the four-cycle filter output voltage will drive it from full conduction to a nonconducting condition resulting in square wave output 29a. Rotary stepping switch drive 30 and rotary switches 31, 32 may be forward acting rotary stepping switches of the type commonly employed in telephone switching circuits and respond quite readily to energizations occurring at a rate of four times a second. The relay of discharge circuit 22 is energized only momentarily during the period between the end of the D interval and the commencement of the following A pulse, while the relay of sampling circuit 23 is energized at the commencement of the D interval and de-energized at the termination thereof.

At the input of the gain adjusting system 25, if no correction voltage is present during the sampling period, the gain adjusting system will be in equilibrium because of the balance maintained in the magnetic amplifier circuit 33. Under these conditions the gain adjusting motor 34 will be inoperative. However, if a correction voltage appears at the input of the gain adjusting system, the magnetic amplifier becomes unbalanced thereby causing the shaft of gain adjusting motor to rotate in a direction dependent upon the polarity of the correction voltage and in such a manner as to adjust the gain of receiver 11.

Reference voltage source 21 is made adjustable so that the invention may be utilized in a system where the synchronizing signal is an energized pulse, and/or where the invention may be used in a system having a plurality of beacons, wherein each beacon has its own individual and characteristic group of pulses and the sum of the amplitudes of the pulses in its characteristic pulse group may or may not be the same for those of the other beacons.

It is to be noted that while the synchronized commutator 26, discharge circuit 22, sampling circuit 23, and gain adjusting system 25 are illustrated as primarily electrical-mechanical systems, it is understood that they may be replaced by their electrical analogues.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic gain control system comprising a source of sequential signal groups, each of said signal groups having a predetermined number of time intervals, a given one of said time intervals including a synchronizing signal and the remainder of said time intervals including pulses whose amplitude summation is to be maintained substantially at a given value, a variable gain amplifier coupled to said source, means coupled to said amplifier to integrate the amplitude of the pulses of each of said signal groups in sequence, a source of reference voltage proportional to said given value coupled to the output of said means to integrate to provide a control signal proportional to the difference between the amplitude of said reference voltage and the integrated value of said pulses of each of said signal groups, means coupled to said amplifier responsive to said synchronizing signal to control the gain of said amplifier in accordance with said control signal during said given one of said time intervals and to reset said means to integrate at the end of said given one of said time intervals to prepare said means to integrate for the succeeding one of said signal groups.

2. An automatic gain control system comprising a source of sequential signal groups, each of said signal groups having a predetermined number of time intervals, the last one of said time intervals including a synchronizing signal and the remainder of said time intervals including pulses whose amplitude summation is to be maintained substantially at a given value, a variable gain amplifier coupled to said source, means coupled to said amplifier to integrate the amplitude of the pulses of each of said signal groups in sequence, a source of reference voltage proportional to said given value coupled to the output of said means to integrate to provide a control signal proportional to the difference between the amplitude of said reference voltage and the integrated value of said pulses of each of said signal groups, means coupled to said amplifier responsive to said synchronizing signal to control the gain of said amplifier in accordance with said control signal during at least a portion of said last one of said time intervals, and means coupled to said amplifier responsive to said synchronizing signal to reset said means to integrate at the end of said last one of said time intervals to prepare said means to integrate for the succeeding one of said signal groups.

3. An automatic gain control system comprising a source of sequential signal groups, each of said signal groups having a predetermined number of time intervals, the last one of said time intervals including a synchronizing signal and the remainder of said time intervals including pulses whose amplitude summation is to be maintained substantially at a given value, a variable gain amplifier coupled to said source, means coupled to said amplifier to integrate the amplitude of the pulses of each of said signal groups in sequence, a source of reference voltage proportional to said given value coupled to the output of said means to integrate to provide a control signal proportional to the difference between the amplitude of said reference voltage and the integrated value of said pulses of each of said signal groups, means coupled to said amplifier to detect said synchronizing signal, means responsive to said detected synchronizing signal to control the gain of said amplifier in accordance with said control signal during said last one of said time intervals, and means responsive to said detected synchronizing signal to reset said means to integrate at the end of said last one of said time intervals to prepare said means to integrate for the succeeding one of said signal groups.

4. An automatic gain control system comprising a source of sequential signal groups, each of said signal groups having a predetermined number of time intervals, the last one of said time intervals including a synchronizing signal and the remainder of said time intervals including pulses whose amplitude summation is to be maintained substantially at a given value, a variable gain amplifier coupled to said source, means coupled to said amplifier to integrate the amplitude of the pulses of each of said signal groups in sequence including means to convert a signal from an alternating type signal to a unidirectional signal, a source of reference voltage proportional to said given value coupled to the output of said means to convert to provide a control signal proportional to the difference between the amplitude of said reference voltage and the integrated value of said pulses of each of said signal groups, means coupled to said amplifier to detect said synchronizing signal, means responsive to said detected synchronizing signal to utilize said control signal to control the gain of said amplifier during said last one of said time intervals, and means responsive to said detected synchronizing signal to reset said means to integrate at the end of said last one of said time intervals to prepare said means to integrate for the succeeding one of said signal groups.

5. An automatic gain control system comprising a source of sequential signal groups, each of said signal groups having a predetermined number of time intervals, the last one of said time intervals including a synchronizing signal and the remainder of said time intervals including bidirectional pulses whose amplitude summation is to be maintained substantially at a given value, a variable gain amplifier coupled to said source, means coupled to said amplifier to integrate the amplitude of the bidirectional pulses of each of said signal groups in sequence including a rectifier to convert said bidirectional pulses to unidirectional pulses, a source of reference voltage proportional to said given value coupled to the output of said rectifier to provide a control signal proportional to the difference between the amplitude of said reference voltage and the integrated value of said bidirectional pulses of each of said signal groups, means coupled to said amplifier to detect said synchronizing signal, means responsive to said detected synchronizing signal to utilize said control signal to control the gain of said amplifier during said last one of said time intervals, and means responsive to said detected synchronizing signal to reset said means to integrate at the end of said last one of said time intervals to prepare said means to integrate for the succeeding one of said signal groups.

6. An automatic gain control system comprising a source of sequential signal groups, each of said signal groups having a predetermined number of time intervals, the last one of said time intervals including a synchronizing signal and the remainder of said time intervals including bidirectional pulses whose amplitude summation is to be maintained substantially at a given value, a variable gain amplifier coupled to said source, means coupled to said amplifier to integrate the amplitude of the bidirectional pulses of each of said signal groups in sequence including an amplifier to amplify said bidirectional pulses, a rectifier to convert said amplified bidirectional pulses to unidirectional pulses and a serially connected resistor-capacitor circuit coupled across the output of said rectifier, a source of reference voltage proportional to said given value coupled to the output of said means to integrate to provide a control signal proportional to the difference between the amplitude of said reference voltage and the integrated value of said bidirectional pulses of each of said signal groups, means coupled to said variable gain amplifier to detect said synchronizing signal, means responsive to said detected synchronizing signal to utilize said control signal to control the gain of said variable gain amplifier during said last one of said time intervals, and means responsive to said detected synchronizing signal to reset said means to integrate at the end of said last one of said time intervals to prepare said means to integrate for the succeeding one of said signal groups.

7. An automatic gain control system comprising a source of sequential signal groups, each of said signal groups having a predetermined number of time intervals, the last one of said time intervals including a synchronizing signal and the remainder of said time intervals including bidirectional pulses whose amplitude summation is to be maintained substantially at a given value, a variable gain amplifier coupled to said source, means coupled to said amplifier to integrate the amplitude of the pulses of each of said signal groups in sequence including at least one amplifier stage, a transformer coupled to the output of said amplifier stage, a rectifier coupled to the secondary winding of said transformer, and a serially connected resistor-capacitor circuit connected across the output of said rectifier, said resistor-capacitor circuit having a time constant greater than the width of said bidirectional pulses for linear addition of said bidirectional pulses of each of said signal groups across said capacitor, a source of reference voltage proportional to said given value coupled to said capacitor to provide a control signal proportional to the difference between the amplitude of said reference voltage and the integrated value of said bidirectional pulses of each of said signal groups, means coupled to said variable gain amplifier to detect said synchronizing signal, means coupled to said variable gain amplifier to control the gain thereof in response to said control signal, means responsive to said detected synchronizing signal to couple said control signal to said gain control means during said last one of said time intervals, and means responsive to said detected synchronizing signal to discharge said capacitor at the end of said last one of said time intervals to prepare said means to integrate for the succeeding one of said signal groups.

8. An automatic gain control system comprising a source of sequential signal groups, each of said signal groups having a predetermined number of time intervals, the last one of said time intervals including a synchronizing signal and the remainder of said time intervals including bidirectional pulses whose amplitude summation is to be maintained substantially at a given value, a variable gain amplifier coupled to said source, means coupled to said amplifier to integrate the amplitude of the pulses of each of said signal groups in sequence including at least one amplifier stage, a transformer coupled to the output of said amplifier stage, a rectifier coupled to the secondary winding of said transformer, and a serially connected resistor-capacitor circuit connected across the output of said rectifier, said resistor-capacitor circuit having a time constant greater than the width of said bidirectional pulses for linear addition of bidirectional pulses of each of said signal groups across said capacitor, a source of reference voltage proportional to said given value coupled to said capacitor to provide a control signal proportional to the difference between the amplitude of said reference voltage and the integrated value of said bidirectional pulses of each of said signal groups, means coupled to said variable gain amplifier to detect said synchronizing signal, means coupled to said variable gain amplifier to control the gain thereof in response to said control signal, a first relay operated switch for applying said control signal to said means to control, a second relay operated switch for discharging said capacitor to prepare said means to integrate for the succeeding one of said signal groups, and means responsive to said detected synchronizing signal to sequentially operate said first relay operated switch during at least a portion of said last one of said time intervals and said second relay operated switch at the end of said last one of said time intervals.

9. An automatic gain control system according to claim 8, wherein said means to control includes a magnetic amplifier coupled to said first relay operated switch and an automatic gain control motor coupled to said variable gain amplifier.

References Cited in the file of this patent

UNITED STATES PATENTS

| | | |
|---|---|---|
| 2,507,695 | Dean | May 16, 1950 |
| 2,866,018 | Bell | Dec. 23, 1958 |